United States Patent Office 2,757,338
Patented July 31, 1956

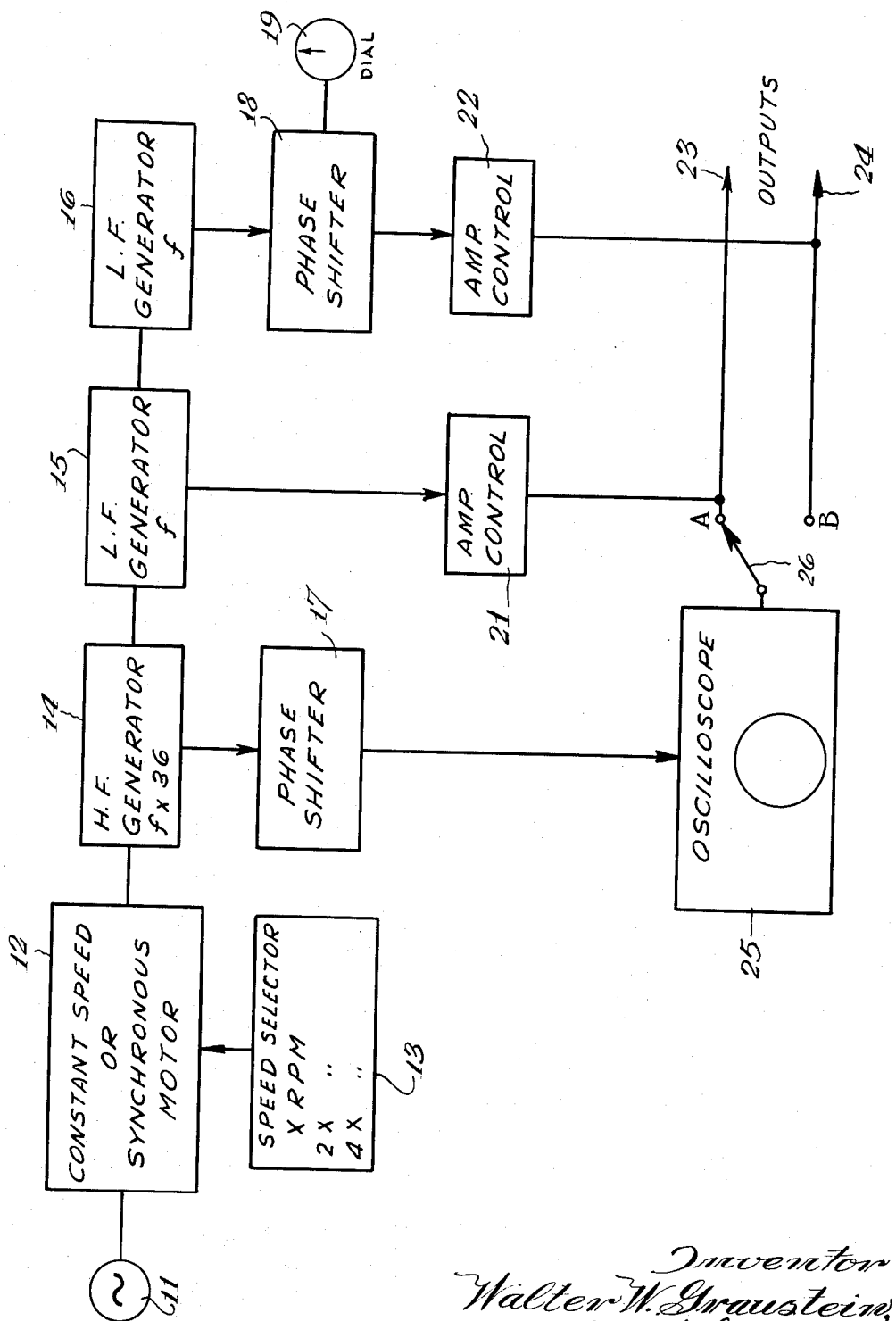

2,757,338
LOW FREQUENCY PHASE INDICATING SYSTEM

Walter W. Graustein, Jr., Watertown, Mass., assignor, by mesne assignments, to Acton Laboratories, Inc., Boston, Mass.

Application August 18, 1953, Serial No. 374,986

6 Claims. (Cl. 324—88)

The present invention relates to a low frequency phase indicating system, and more particularly to such system operating within the range of 15 to 60 cycles per second.

In a particular field of operation it is desired to have a means for indicating with considerable accuracy the phase shift between relatively low alternating current frequencies such as, for example, 15 to 60 cycles per second. It furthermore is desired to have such indication accurate to about $1/10$ of a degree. To provide a system and method to obtain the desired result is one of the objectives of the present invention.

A further object of the invention is to provide a system for checking accurately the phase shift between two low frequencies including a range from 15 to 60 cycles alternating current.

A further object of the invention is to provide a method and system for accurately determining the phase shift between two low frequency alternating currents or voltages having a phase shift from zero to 360° with an accuracy $\pm 1/10°$.

A further object of the invention is to provide a method of calibrating the phase shift means for one of two low frequency alternating current generators.

Other and further objects of the invention subsequently will become apparent by reference to the description accompanying the drawing wherein the figure is a block diagram of the system embodying the present invention.

One of the classic methods for measuring the phase angle between two voltages is by means of the Lissajous pattern obtained when a voltage is connected to one set of deflection plates of an oscilloscope and another voltage of the same frequency but of different phase is connected to the other set of plates. If the frequency of one of the voltages is made an exact multiple of the frequency of the other voltage, a more intricate Lissajous pattern results. Changing the phase of either one of the voltages produces a change in the configuration of the Lissajous pattern. However the effect upon the pattern of changing the phase of the lower frequency a given amount is considerably greater than the effect of changing the phase of the higher frequency by the same amount. It is proposed to take advantage of this known method in setting up a system for low frequency phase indication shown in the drawing.

The drawing is a block diagram indicating a source of alternating current 11, which may be the commercial alternating current supplied by power companies. This is connected to energize a constant speed or synchronous motor 12, which is provided in one embodiment with a speed selector 13 to provide three different speeds, the highest speed being four times that of the lowest speed. The constant speed or synchronous motor 12 is connected to an alternating current generator 14, which is also connected to a low frequency generator 15 and a second similar low frequency generator 16. For example, the low frequency alternating current generators 15 and 16 at the low speed of the synchronous motor 12 may have an output of 15 cycles per second. The higher frequency alternating current generator 14 at this speed would have an output which is the 36th multiple of the output of the generators 15 and 16, or in other words 540 cycles.

The alternating current generator 14 preferably is provided with a physically movable field so that by means of a phase shifter mechanism 17 the phase relation of the output of the generator 14 may be changed. The low frequency alternating current generator 16 likewise is provided with a movable field which is adjusted by the phase shifter mechanism 18 connected to an indicating dial 19. The phase shifter 18 is so arranged that the alternating current output of the generator 16 may be shifted from zero to 360° with respect to the output of the alternating current generator 15. The outputs of the alternating current generators 15 and 16 are passed through amplitude control networks 21 and 22 so that the amplitudes of the currents available at the output conductors 23 and 24 are adjustable.

The outputs of the phase shifter 17 and the high frequency generator 14 are applied to one set of deflection plates or deflection means of a cathode ray oscilloscope 25. The other deflection means of the oscilloscope 25 are arranged to be selectively energized by means of a switch 26 from either of the alternating current outputs of the amplitude control units 21 and 22.

If the switch 26 is at the position A shown, a Lissajous pattern will appear on the oscilloscope 25. The phase shifter 17 is adjusted so that the pattern is properly positioned on the oscilloscope tube and is of a form which will serve as a phase reference. Thereafter the switch 26 is thrown to the position B, and the phase shifter 18 is adjusted until the reference pattern has been obtained. Further adjustment of the phase shifter 18 will produce a repetition of the pattern for every 5° of phase shift of the alternating current output of the generator 16 with respect to the generator 15. Thus it is possible to observe the dial indication 19 and obtain 72 absolutely accurate indications of phase shift for the phase shifter 18.

It is further known that a phase shift of one voltage with respect to another will produce an exact repetition of the Lissajous pattern every 180°. With a 90° phase shift a particular recognizable pattern is obtained, and at 270° a similar mirror image pattern is obtained. At intermediate phase shifts the Lissajous pattern gradually changes from the reference standard to the one obtained by 90° phase shift of the high frequency voltage and back to the pattern at 180°. During this change there is an intersection of the pattern with respect to a reference line on the face of the cathode ray tube. With the frequency ratio indicated between the generators 14 and 15, this travel on a five inch cathode ray tube would be about $4/5$ of an inch for one degree of phase shift. From this it is apparent that a rather accurate determination of phase shift can be ascertained.

Further details as to the reason for this interpretation and method of phase determination are set forth in a report published March 3, 1952, identified as "Technology Instrument Corporation Laboratory Report No. 5" by Hollis Gray, Jr. and Walter W. Graustein entitled "A Primary Phase Standard Assembly."

If a higher speed is selected for the constant speed or synchronous motor 12, it, of course, is apparent that the generators 14, 15 and 16 will double or quadruple their output frequencies. The accuracy of phase determination at the higher frequency will be comparable to that obtained for the lowest frequency.

While for the purpose of illustrating and describing the present invention a particular system has been indicated in the drawing, it is to be understood that appropriate variations in the components employed and in their connection are contemplated as may be commensurate

I claim as my invention:

1. A motor generator phase standard comprising a synchronous alternating current motor, a pair of low frequency alternating current generators of the same frequency driven by said motor, one of said generators having indicator means for shifting the phase of the output thereof relative to the other generator, a third higher frequency alternating current generator driven by said motor having an output frequency which is a higher multiple of the alternating current frequency of said first generators, means for shifting the phase of the output of said latter generator, an oscilloscope having deflection means energized from said latter generator, and circuit means for selectively energizing the other oscilloscope deflection means from either of said first generators.

2. A motor generator phase standard comprising an alternating current motor having a constant speed characteristic, a pair of alternating current generators of the same frequency driven by said motor, one of said generators being provided with means for shifting the phase of the output thereof relative to the other generator, a third alternating current generator driven by said motor having an output frequency relatively higher than for the first generators, said latter generator having means for shifting the phase of the output thereof, an oscilloscope having a pair of deflection plates energized from said latter generator, and circuit means for selectively energizing the remaining oscilloscope plates from either of said first generators.

3. A motor generator phase standard comprising an alternating current motor having a constant speed characteristic, a pair of alternating current generators of the same frequency driven by said motor and having low frequency outputs, one of said generators being provided with calibrated means for shifting the phase of the output thereof relative to the other generator, a third alternating current generator driven by said motor having an output frequency which is a multiple of that of said first generators, said latter generator having means for shifting the phase output thereof, an oscilloscope having a pair of deflection plates energized from said latter generator, and circuit means for selectively energizing the remaining oscilloscope plates from either of said first generators.

4. A phase standard comprising a constant speed motor, a pair of alternating current generators of the same frequency driven thereby and having low frequency outputs, one of said generators being provided with calibrated phase shifting means, a third alternating current generator driven by said motor having an output frequency which is the 36th multiple of that of said first generators, said latter generator having means for shifting the phase of the output thereof, an oscilloscope having a pair of deflection plates energized from said latter generator, and circuit means for selectively energizing the remaining oscilloscope plates from either of said first generators, said circuit means including means for limiting to a constant value the amplitudes of the energies applied to said remaining oscilloscope plates.

5. A low frequency phase standard comprising a synchronous motor, a pair of lower frequency alternating current generators of the same frequency driven thereby, one of said generators being provided with calibrated phase shifting means, a third alternating current generator driven by said motor having an output frequency which is 36 times as great as that of said first generators, said latter generator having means for shifting the phase of the output thereof, an oscilloscope having a pair of deflection plates energized from said latter generator, and circuit means for selectively energizing the remaining oscilloscope plates from either of said first low frequency generators.

6. A motor generator phase standard comprising an alternating current motor having a constant speed characteristic, a pair of alternating current generators of the same frequency driven by said motor and having low frequency outputs, one of said generators being provided with calibrated means for shifting the phase of the output thereof relative to the other generator, a third alternating current generator driven by said motor having an output frequency which is a multiple of that of said first generators, and means for shifting the phase of the output of the latter alternating current generator, an oscilloscope having a pair of deflection plates energized from said latter generator, and circuit means for selectively energizing the remaining oscilloscope plates from either of said first generators.

References Cited in the file of this patent
UNITED STATES PATENTS 2,580,803    Logan  ---------------- Jan. 1, 1952